(12) United States Patent
Amatatsu et al.

(10) Patent No.: US 11,416,480 B2
(45) Date of Patent: Aug. 16, 2022

(54) RETRIEVAL METHOD AND NON-TRANSISTORY COMPUTER READABLE STORAGE MEDIUM

(71) Applicant: asken Inc., Tokyo (JP)

(72) Inventors: Jiro Amatatsu, Tokyo (JP); Shin Sato, Tokyo (JP); Takahiro Fujiwara, Tokyo (JP); Eric Michael Hart, Tokyo (JP); Michael Thomas Staffa, Tokyo (JP)

(73) Assignee: ASKEN INC., Tokyo (JP)

( * ) Notice: Subject to any disclaimer, the term of this patent is extended or adjusted under 35 U.S.C. 154(b) by 0 days.

(21) Appl. No.: 17/092,482

(22) Filed: Nov. 9, 2020

(65) Prior Publication Data

US 2021/0141788 A1 May 13, 2021

(30) Foreign Application Priority Data

Nov. 11, 2019 (JP) ............................. JP2019-204286

(51) Int. Cl.
*G06F 16/248* (2019.01)
*G06F 16/242* (2019.01)

(52) U.S. Cl.
CPC ........ *G06F 16/2425* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 10,055,784 B1* | 8/2018 | Boelter | .............. | G06Q 30/0641 |
| 10,332,181 B1* | 6/2019 | McAllister | ......... | G06Q 30/0629 |
| 2005/0228780 A1* | 10/2005 | Diab | .................. | G06Q 30/0256 |
| 2007/0005576 A1* | 1/2007 | Cutrell | .............. | G06F 16/90335 |
| 2007/0168335 A1* | 7/2007 | Moore | .................. | G06F 16/951 |
| 2010/0223252 A1* | 9/2010 | Broman | ................ | G06F 16/954 |
| | | | | 707/709 |
| 2012/0166182 A1* | 6/2012 | Ko | ........................ | G06F 40/274 |
| | | | | 704/9 |
| 2017/0068655 A1* | 3/2017 | Wang | .................... | G06F 40/289 |
| 2017/0078251 A1* | 3/2017 | Grubbs | .............. | H04L 63/0471 |

(Continued)

FOREIGN PATENT DOCUMENTS

JP 2002-312488 10/2002

OTHER PUBLICATIONS

Asken Inc., "Calorie Counter—Asken Diet", <https://play.google.com/store/apps/details?id=com.askendiet.us.asken&hl=ja>, published on Mar. 11, 2019, retrieved from Google Play on Nov. 11, 2019.

(Continued)

*Primary Examiner* — Wilson Lee
(74) *Attorney, Agent, or Firm* — Capitol IP Law Group, PLLC

(57) ABSTRACT

A retrieval method including outputting a first retrieval result to a result area, the first retrieval result being obtained by referring to a first database based on a first retrieval query entered into a retrieval area, outputting a second retrieval result and the first retrieval result in the result area, the second retrieval result being obtained by referring the first database based on a second retrieval query in response to acquiring a delimiter character and the second retrieval query entered next to the first retrieval query in the retrieval area.

17 Claims, 15 Drawing Sheets

(56) References Cited

U.S. PATENT DOCUMENTS

| | | | |
|---|---|---|---|
| 2017/0169007 A1* | 6/2017 | Francis | G06F 3/0482 |
| 2017/0169027 A1* | 6/2017 | Ben-Tzur | G06F 16/2425 |
| 2017/0169030 A1* | 6/2017 | Ben-Tzur | G06F 16/9535 |
| 2019/0103193 A1* | 4/2019 | Padgett | G06F 16/338 |

OTHER PUBLICATIONS

"Multi-Search food items", <https://supportaskendiet.com/hc/en-us/articles/360019407813-Multi-Search-food-items>, published on Mar. 12, 2019, retrieved from Asken Diet.

Asken Inc., "Calorie Counter—Asken Diet", <https://apps.apple.com/us/app/calorie-counter-asken-diet/id1161305507?ls=1>, published on Jun. 17, 2019, retrieved from Apple Store.

* cited by examiner

RETRIEVAL METHOD AND NON-TRANSISTORY COMPUTER READABLE STORAGE MEDIUM

CROSS-REFERENCE TO RELATED APPLICATION

This application claims priority from and the benefit of Japanese Patent Application No. 2019-204286, filed on Nov. 11, 2019, which is hereby incorporated by reference for all purposes as if fully set forth herein.

BACKGROUND

Field

Exemplary embodiments relate to a retrieval system, a retrieval method, and a non-transitory computer readable storage medium.

Discussion of the Background

Conventionally, an application program for recording daily meals, and managing nutritional balance and calorie intake for health management purposes is known. The user records daily meals by recording the date and time of meals, types of meals (breakfast, lunch, dinner), and food in the application program installed on a portable terminal such as a smartphone.

A retrieval method used when recording foods in the application program includes methods such as keyword retrieval, image analysis, or bar code reading. Though the method of specifying the foods by image analysis and bar code reading greatly reduces the burden of the user, it is mainstream to carry out the keyword retrieval at present due to the restriction of accuracy and existence of data.

Patent Document 1 discloses a dietetic treatment supporting system for retrieving foods by menu retrieval, keyword retrieval, calorie retrieval, and the like. In the case of keyword retrieval, a method of inputting a keyword in a keyword retrieval screen, displaying a list of foods corresponding to the keyword, and allowing the user to select a food is described (for example, Japanese laid-open patent publication No. 2002-312488).

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a retrieval system, a retrieval method, and a non-transitory computer readable storage medium.

Additional aspects will be set forth in the detailed description which follows, and, in part, will be apparent from the disclosure, or may be learned by practice of the inventive concept.

According to exemplary embodiments, a retrieval method includes outputting a first retrieval result to a result area, the first retrieval result being obtained by referring to a first database based on a first retrieval query entered into a retrieval area, and outputting a second retrieval result and the first retrieval result in the result area, the second retrieval result being obtained by referring the first database based on a second retrieval query in response to acquiring a delimiter character and the second retrieval query entered next to the first retrieval query in the retrieval area.

According to exemplary embodiments, a retrieval method includes providing a display screen including a retrieval area and a result area, outputting a first retrieval result to a result area, the first retrieval result being obtained by referring to a first database based on a first retrieval query entered into a retrieval area, and outputting a second retrieval result and the first retrieval result in the result area, the second retrieval result being obtained by referring the first database based on a second retrieval query in response to acquiring a delimiter character and the second retrieval query entered next to the first retrieval query in the retrieval area.

According to exemplary embodiments, a non-transitory computer readable storage medium storing instructions executable to perform operations includes providing a display screen including a retrieval area and a result area, outputting a first retrieval result to a result area, the first retrieval result being obtained by referring to a first database based on a first retrieval query entered into a retrieval area, and outputting a second retrieval result and the first retrieval result in the result area, the second retrieval result being obtained by referring the first database based on a second retrieval query in response to acquiring a delimiter character and the second retrieval query entered next to the first retrieval query in the retrieval area.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
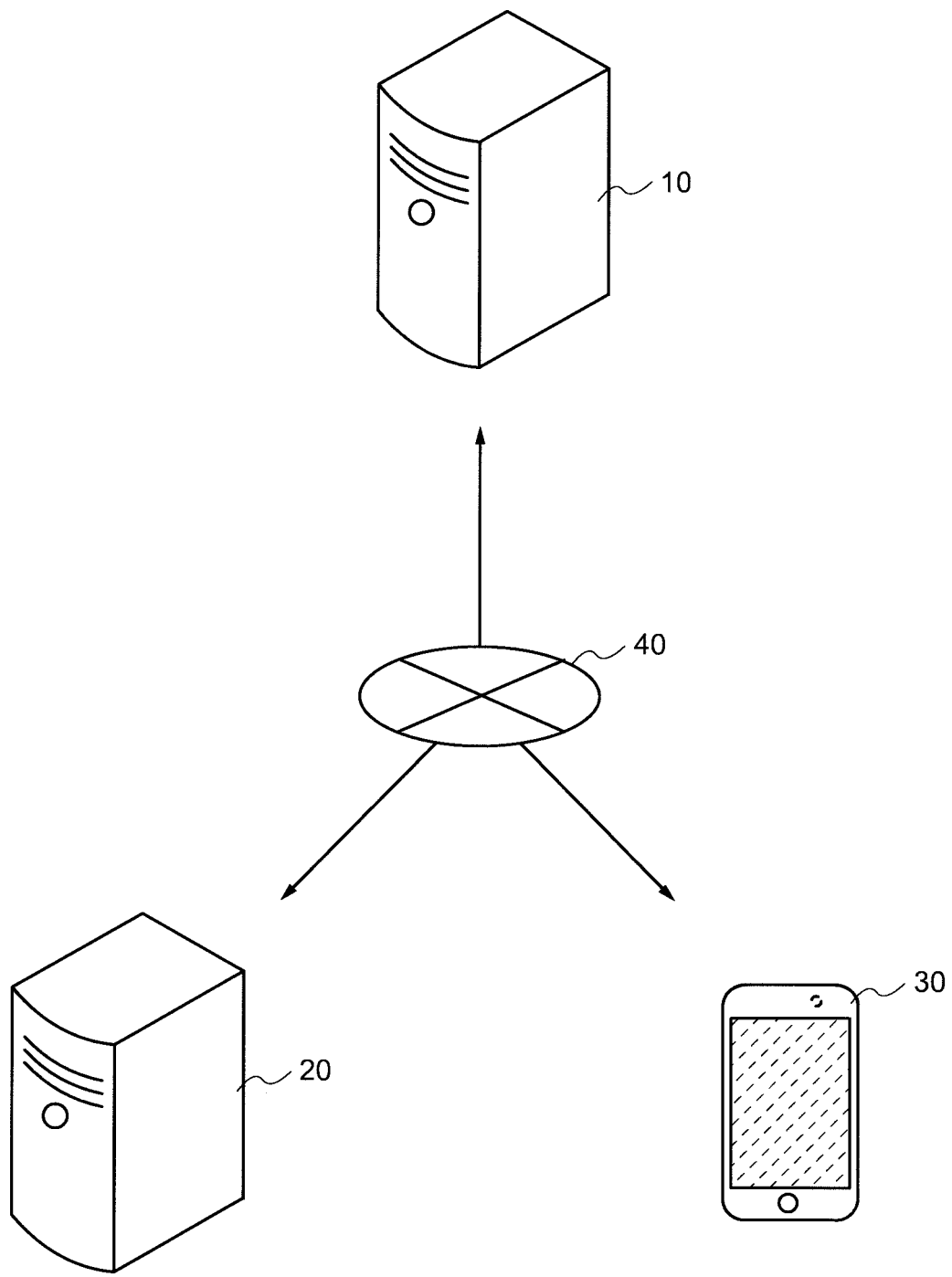
FIG. 1 is a diagram illustrating an outline of a retrieval system according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Exemplary embodiments will be described below referring to the drawings and the like. However, the inventive concept can be implemented in many different modes and should not be construed as being limited to the description of the following exemplary embodiments. In this specification and each drawing, the same reference numerals are assigned to the same elements as those described above referring to the preceding drawings, and detailed description thereof may be omitted as appropriate.

In the present exemplary embodiment, a retrieval system, a retrieval method, and a non-transitory computer readable storage medium will be described referring to FIG. 1 to FIG. 15.

<Retrieval System>

An outline of a retrieval system 1 according to an exemplary embodiment will be described. FIG. 1 is a schematic diagram of the retrieval system 1 according to an exemplary embodiment. The retrieval system 1 is configured to a retrieval server 10, a database server 20, and a portable terminal 30. The portable terminal 30 and the retrieval server 10 are interconnected via a network 40, and the retrieval server 10 and the database server 20 are interconnected via the network 40.

The retrieval server 10 transmits and receives data to and from each of the portable terminal 30 and the database server 20. The retrieval server transmits the retrieval query to the database server 20 in response to acquiring a retrieval query from the portable terminal 30 with a application program installed to manage meals. The retrieval server transmits the retrieval result to the portable terminal 30 in response to acquiring the retrieval result from the database server 20. The retrieval server 10 transmits and receives data and processing requests to and from each of the portable terminal 30 and the database server 20 via API (Application Programming Interface).

In response to the request processing from the retrieval server 10, the database server 20 retrieves referring to the database for food management and transmits the retrieval result to the retrieval server 10. The database server 20 may include a user management database for managing users and a meal management database for managing meals recorded by users.

The portable terminal 30 is, for example, an electronic device such as a smart phone or a tablet.

<Program Outline>

A program stored in a storage medium according to an exemplary embodiment will be described referring to FIG. 2 to FIG. 8. The program is executed by a computer, so that "keyboard operation for keyword input" and "food selection operation" can be executed on a single screen when a user searches and records foods. When the program is executed by the computer, a search area and a result area including the search results of a plurality of foods are displayed on a single screen.

Figure 2:
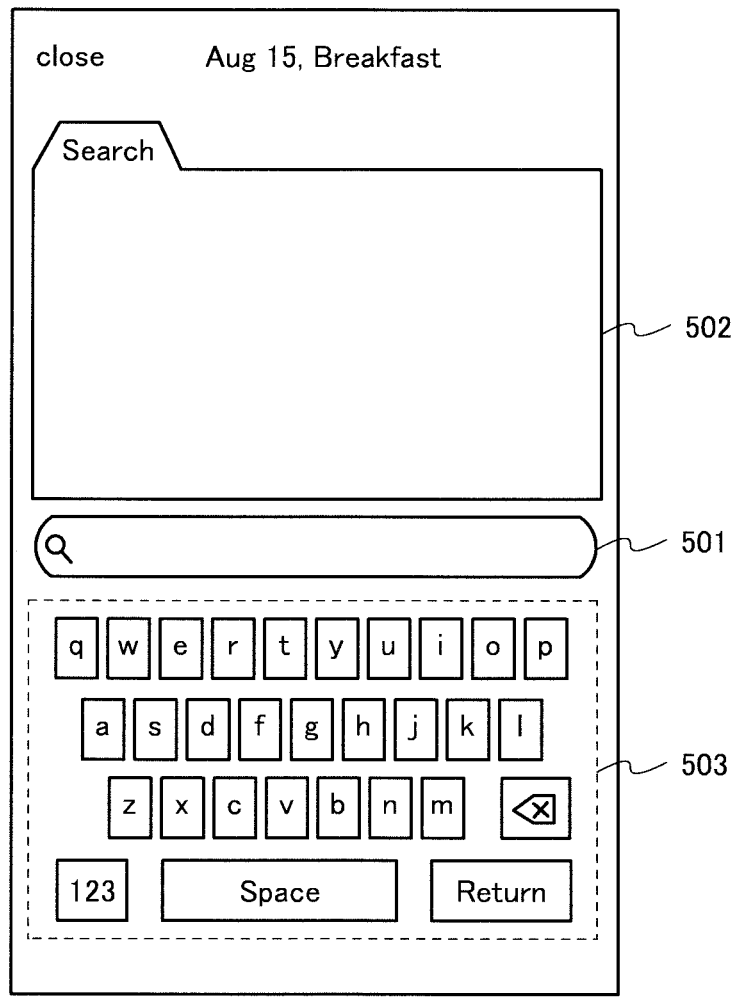
FIG. 2 is a display screen implemented by a program according to an exemplary embodiment.

FIG. 2 shows a display screen 500 of the portable terminal 30 when retrieving a food. As shown in FIG. 2, the display screen 500 displays a retrieval area 501 (also referred to as a retrieval window), a result area 502, and a keyboard area 503. The keyboard area 503 is an area for inputting the retrieval query. The retrieval query is input in the retrieval area 501. The retrieval query can be one word or a plurality of words. When more than one word is entered in the retrieval area 501 as a search query, for example, it is preferred that a single space is entered between the word and the word. The retrieval results according to the retrieval query are displayed in the result area 502.

Figure 3:
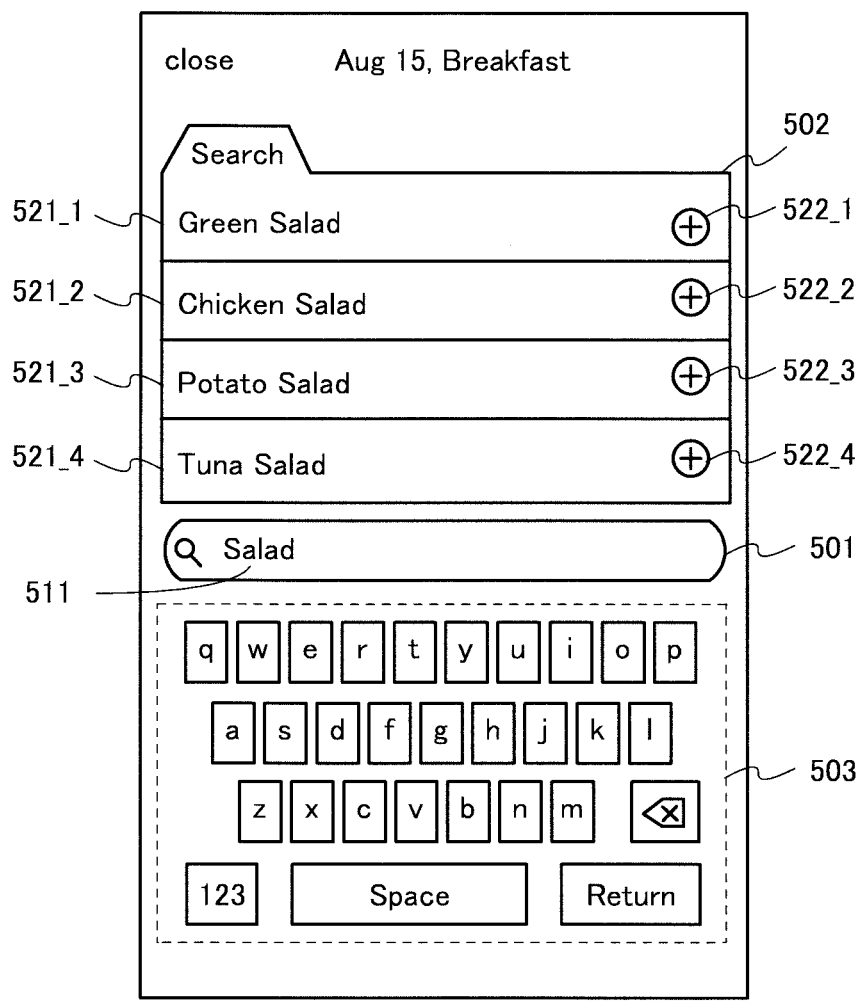
FIG. 3 is a display screen implemented by a program according to an exemplary embodiment.

FIG. 3 shows a display screen 500A after the first retrieval query has been input into the retrieval area 501. As shown in FIG. 3, the portable terminal 30 transmits the first retrieval query 511 to the retrieval server 10 in response to inputting a first retrieval query in the retrieval area 501. The retrieval server 10 transmits the acquired first retrieval query 511 to the database server 20. The database server 20 retrieves for foods based on the acquired first retrieval query 511 and transmits a results list containing the plurality of foods according to the first retrieval query 511 to the retrieval server 10. The retrieval server 10 outputs the results list to the result area 502.

A so-called incremental search may also be performed to display a list of candidate food products by retrieving each time one character of the retrieval query is entered in the retrieval area 501. Retrieval may be executed after the word of the retrieval query has been input to display the list of food candidates.

FIG. 3 shows the display screen 500A in which a results list including a plurality of retrieval results 521_1 to 521_4 according to the first retrieval query 511 is displayed in the result area 502. A list of results including a plurality of retrieval results 521_1 to 521_4 of "Salad" is displayed in the result area 502 in response to entering "Salad" as the first retrieval query 511 in the retrieval area 501. In each of the retrieval results 521_1 to 521_4 of the plurality of "Salad", recording icons 522_1 to 522_4 is displayed. The user can record in the database server 20 by selecting a target food from the results list displayed on the result area 502 and selecting one of the recording icons 522_1 to 522_4.

Figure 4:
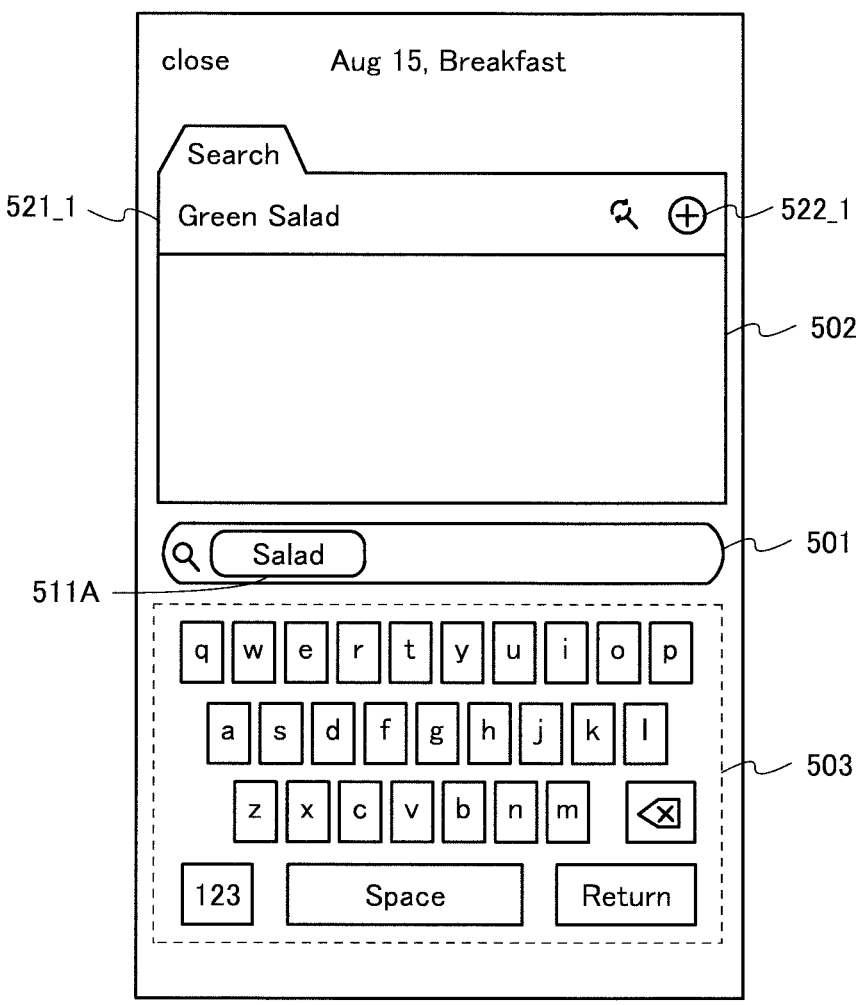
FIG. 4 is a display screen implemented by a program according to an exemplary embodiment.

By executing the program according to an exemplary embodiment with a computer, after the results list is displayed on the result area 502, the next food may be retrieved prior to recording the target food in the database server 20. In addition, a second retrieval query 512 can be input in the same area as the retrieval area 501 in which the first retrieval query 511 is input. As shown in FIG. 3, the first retrieval query 511 is input in the retrieval area 501. Next, one food is selected from the results list and output to the result area 502 in response to inputting delimiters (also called word delimiters) in the retrieval area 501. FIG. 4 shows a display screen 500B after the delimiter is input in the retrieval area 501. In FIG. 4, "Green Salad" as a retrieval result of "Salad" is displayed in the result area 502. Here, the selected retrieval result is, for example, a food that has been selected by the user in the past.

The delimiter divides the retrieval query that is consecutively input. The delimiter includes spaces, commas, slashes, newlines, pipelines, and so on. When dividing multiple retrieval queries by spaces, it is preferable that spaces are entered twice to distinguish them from retrieval queries consisting of multiple words. There is no particular limitation on the type of delimiter when it is possible to distinguish between the single retrieval query consisting of a plurality of words and the plurality of retrieval queries.

A display format of the first retrieval query 511 may be changed to indicate that the retrieval query has been already retrieved in response to the delimiter inputting after the first retrieval query 511. As shown in FIG. 4, in the display screen 500B, a retrieved first retrieval query 511A in which the display format has been changed in the retrieval area 501 is displayed. In FIG. 4, the word "Salad" appears surrounded by a figure. The color and other forms of the characters of the first retrieval query 511A may be changed and displayed.

Figure 5:
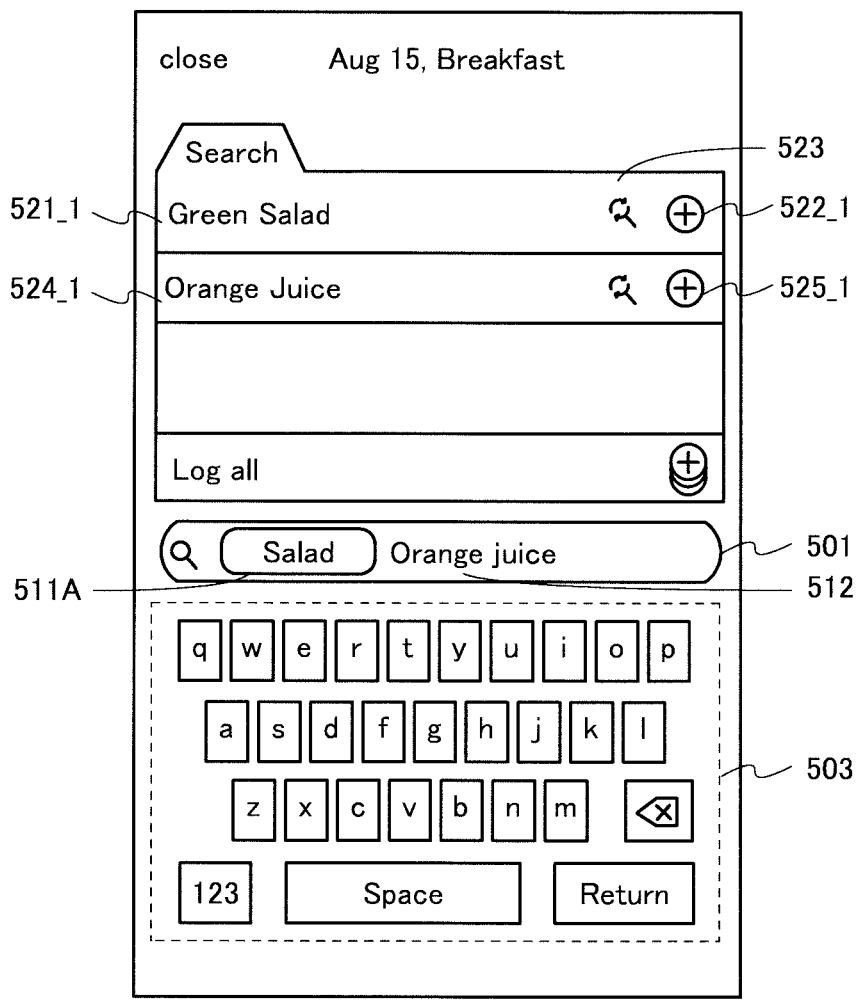
FIG. 5 is a display screen implemented by a program according to an exemplary embodiment.

FIG. 5 shows a display screen 500C after the second retrieval query 512 is input to the retrieval area 501 after the first retrieval query 511A. The second retrieval query 512 is transmitted to the retrieval server 10 in response to the second retrieval query 512 inputting to the retrieval area 501 after the delimiter. The retrieval server 10 transmits the acquired second retrieval query 512 to the database server 20. The database server 20 retrieves for foods based on the acquired second retrieval query 512 and transmits the results list including a plurality of food lists in according to the second retrieval query 512 to the retrieval server 10. The retrieval server 10 displays any one of the retrieval results 525_1 from the results list on the result area 502. The retrieval result 521_1 of the first retrieval query 511 and the retrieval result 525_1 of the second retrieval query 512 are displayed in the result area 502, when the retrieval result 521_1 of the first retrieval query 511 is not recorded in the database server 20. In other words, the retrieval result 521_1 of the first retrieval query 511 and the retrieval result 525_1 of the second retrieval query 512 can be displayed in the same display screen 500C.

In the retrieval area 501, the "Salad" of the retrieved first retrieval query 511A and the newly input "Orange juice" of the second retrieval query 512 are input. A retrieval result 524_1 of "Orange juice" is displayed below a retrieval result 521_1 of "Green Salad" in the result area 502. In the retrieval area 501, when the delimiter is input after the second retrieval query and a third retrieval query is input, the process proceeds to the retrieval of the third retrieval query.

The retrieval results 521_1 and 524_1 can be checked in detail, when the retrieval result 521_1 of the first retrieval query 511 or a retrieval result 524_1 of the second retrieval query 512 does not include the target food. For example, as shown in FIG. 5, a results list of a plurality of foods corresponding to the first retrieval query 511 is output to the result area 502 in response to selecting a re-retrieval icon 523 of the retrieval result 521_1.

Figure 6:
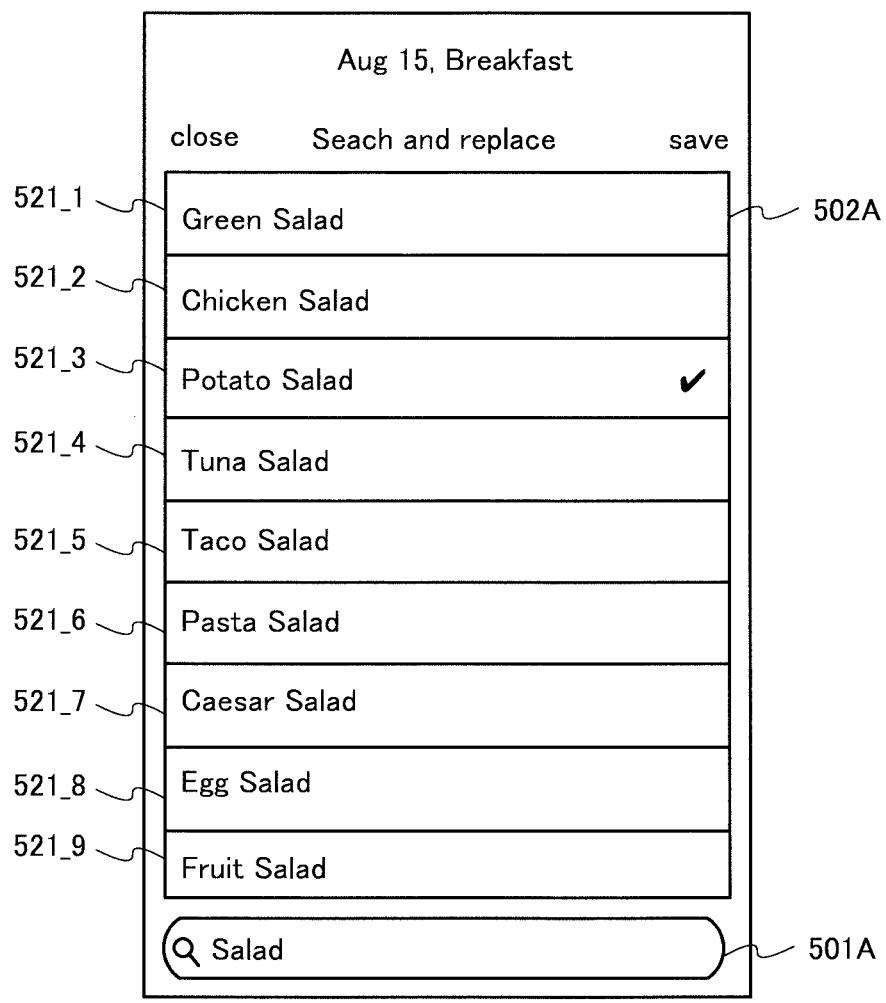
FIG. 6 is a display screen implemented by a program according to an exemplary embodiment.

As shown in FIG. 6, the results list, which is the retrieval result of "Salad", is output to a result area 502A. Other candidates for "Salad" may also be identified in detail in the result area 502A. When "Potato Salad" is selected from the results list and "Save" is selected, the retrieval result 521_1 can be updated from "Green Salad" to "Potato Salad".

Figure 7:
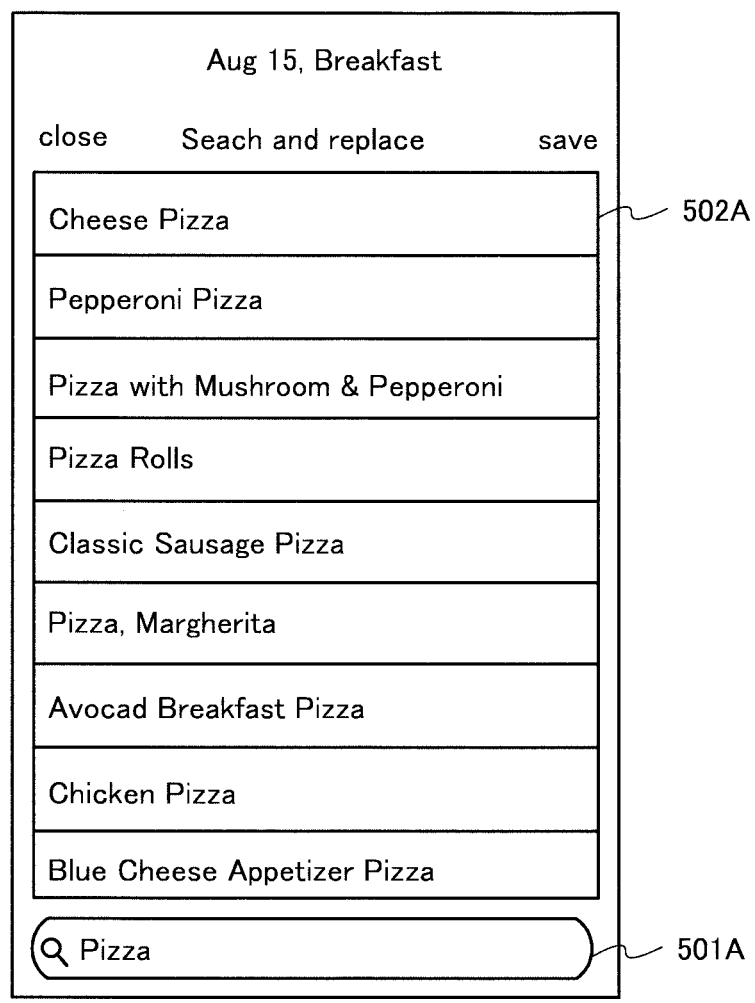
FIG. 7 is a display screen implemented by a program according to an exemplary embodiment.
Figure 8:
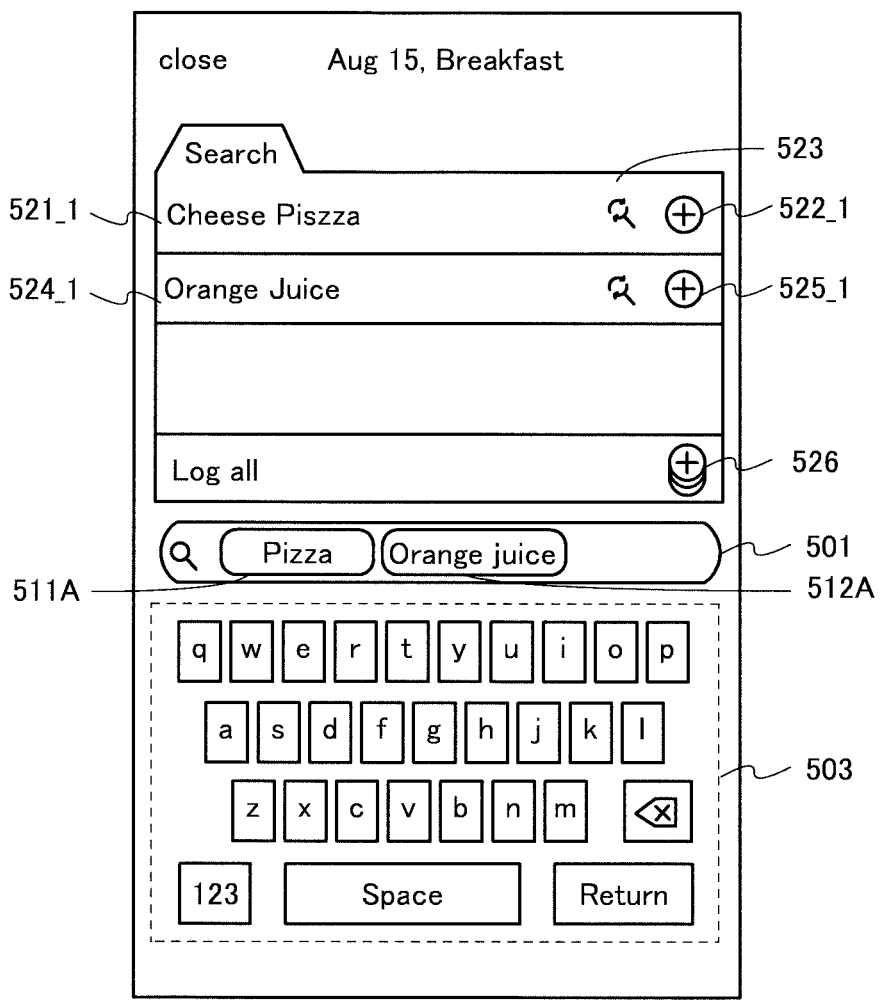
FIG. 8 is a display screen implemented by a program according to an exemplary embodiment.

The first retrieval query 511 displayed on a retrieval area 501A can be edited. As shown in FIG. 7, the first retrieval query 511 displayed on the retrieval area 501A is edited from "Salad" to "Pizza". Then, the results list, which is the retrieval result of "Pizza", is output to the result area 502A. When "Cheese Pizza" is selected from the results list and "Save" is selected, the retrieval result 521_1 can be updated from "Green Salad" to "Cheese Pizza". As shown in FIG. 8, the first retrieval query 511A displayed on the retrieval area 501 can also be updated from "Salad" to "Pizza".

When the retrieval results are recorded in the retrieval system 1, the recording icons 522_1 and 525_1 may be selected to record the retrieval results one by one in the database server 20, or a recording icon 526 may be selected to record all the retrieval results in the database server 20. The corresponding retrieval query is deleted in response to the retrieval result recording in the database server 20.

As described above, in the non-transitory computer readable storage medium according to the present exemplary embodiment, the plurality of the retrieval queries can be sequentially input and retrieved in one retrieval area 501. The retrieval result of the plurality of retrieval queries are displayed in the same display screen as the retrieval area. After terminating the retrieval of all the foods, the user can confirm whether each retrieval result is the target food. Therefore, in the non-transitory computer readable storage medium according to the present exemplary embodiment, "keyboard operation for keyword input" and "food selection operation" can be separately executed. Further, since the retrieval area 501 and the result area 502 are displayed on the same screen, it is possible to reduce screen transitions between retrieving and recording a plurality of foods. This allows users to retrieve and record foods faster. Therefore, the convenience of the users can be improved when the users input the plurality of items to the system.

Hereinafter, the configuration of the retrieval system 1 according to an exemplary embodiment will be described in detail.

<Hardware Configuration of the Retrieval Server>

Figure 9:
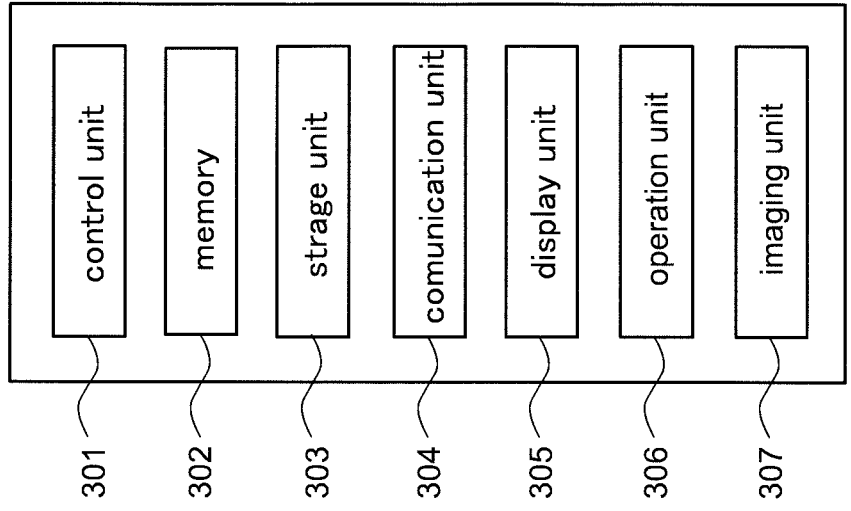
FIG. 9 is a diagram illustrating a hardware configuration of a retrieval server according to an exemplary embodiment.
Figure 9:
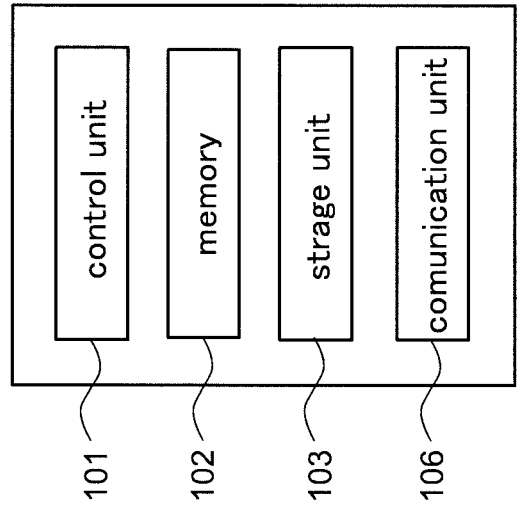

FIG. 9 is a diagram showing a hardware configuration 100 of the retrieval server 10. The retrieval server 10 includes a control unit 101, a memory 102, a storage unit 103, and a communication unit 106.

The control unit 101 is, for example, a CPU (Central Processing Unit) or the like, executes a program. For example, the control unit 101 reads the program recorded in the storage unit 103, expands the program in the memory 102, and executes the program.

The storage unit 103 is, for example, a recording device capable of permanently holding data such as a non-volatile memory or an HDD (Hard Disk Drive) or an SSD (Solid State Drive) and rewriting the data. The recording medium stores data such as a program and a parameter required in the operation of the program.

The memory 102 is, for example, a rewritable memory device used for temporarily holding information such as a volatile memory. The memory 102 is used as an expansion area of the program recorded in the storage unit 103 and a storage area for storing intermediate data or the like output in the operation of the program.

The communication unit 106 is a communication interface. In the present exemplary embodiment, the retrieval server 10 connects to the database server 20 through the network by the communication unit 106 and transmits and receives data to and from the database server 20.

<Hardware Configuration of the Portable Terminal>

FIG. 9 is a diagram showing a hardware configuration of the portable terminal 30. The portable terminal 30 includes a control unit 301, a memory 302, a storage unit 303, a communication unit 304, a display unit 305, an operation unit 306, and an imaging unit 307.

The control unit 301 is, for example, a CPU or the like, executes a program. The control unit 301 reads out, for example, a program recorded in the storage unit 303, expands the program in the memory 302, and executes the program. The communication unit 304 transmits and receives data to and from the retrieval server 10.

The display unit 305 is a liquid crystal display or an EL display. The operation unit 306 may be an operation key, a button, or the like, and may be a touch sensor capable of detecting a coordinate touched by the user on the area of the display instead of the operation key or the button. In this case, the input operation is realized by a software key or the like controlled by the touch sensor and the program. The imaging unit 307 is a camera and captures an image of a meal.

<Software Configuration>

Figure 10:
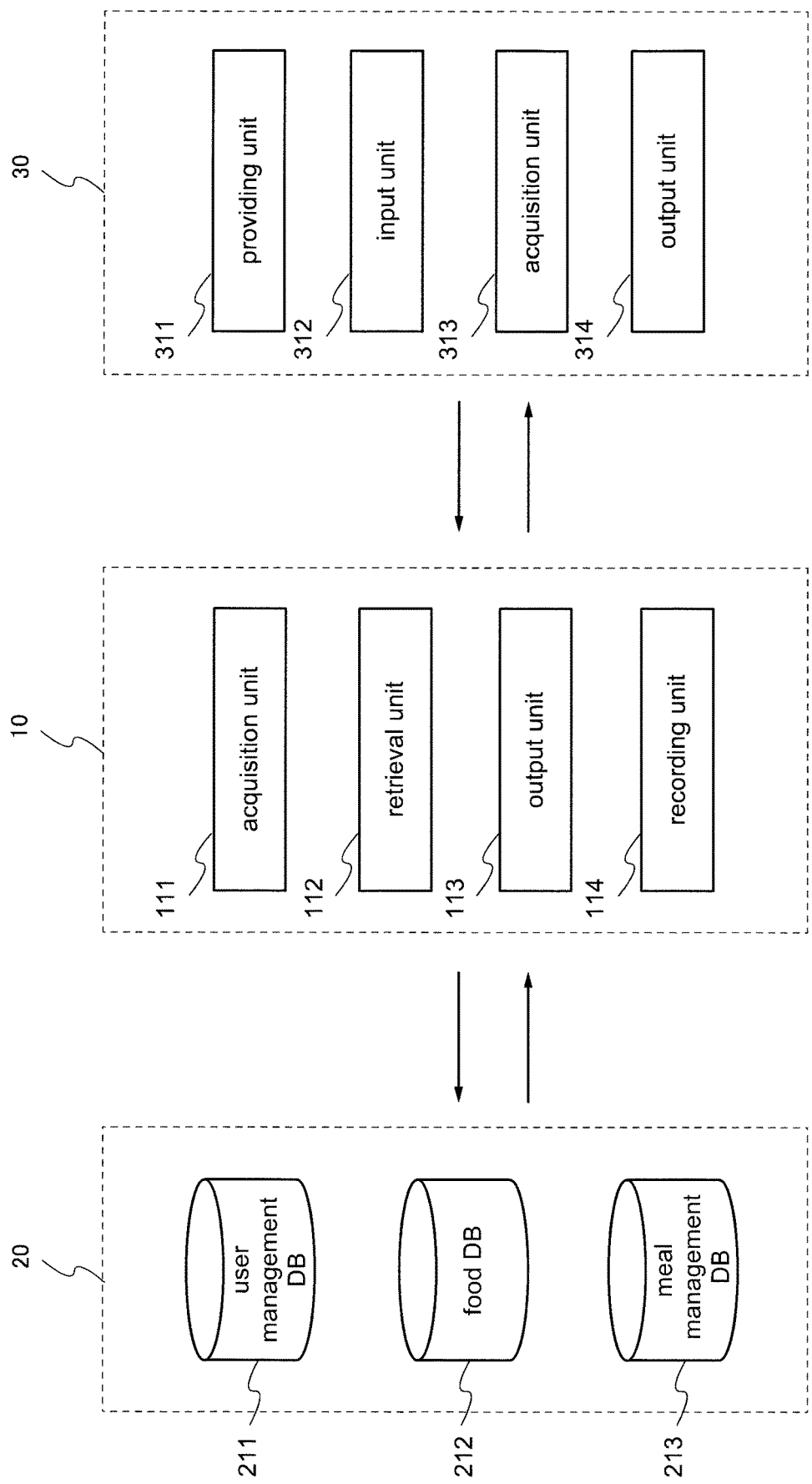
FIG. 10 is a diagram illustrating a functional block of a retrieval server system according to an exemplary embodiment.

FIG. 10 is a diagram showing a software configuration of the retrieval server 10, the database server 20, and the portable terminal 30.

The database server 20 includes a user management DB211, a food DB212, and a meal management DB213.

The user management DB211 is a database in which user information is recorded, and includes items such as user ID, password, mail address, age, gender, height, weight, and the like.

The food DB212 is a data base in which food information of various meals is recorded. For example, the food DB212 has items such as a food ID, a food name, a calorie, and a foodstuff included in a food. The items of the food DB212 may include meal images. The items of the food DB212 may include bar codes.

The meal management DB213 is a database that manages the meal information recorded by the user. The meal management DB213 includes items such as a user ID, date, type of meal, item ID, item name, quantity, calories, and foodstuffs included in a food, meal images, and the like.

In the retrieval server 10, the program for executing the retrieval method includes an acquisition unit 111, a retrieval unit 112, an output unit 113, and a recording unit 114.

The acquisition unit 111 acquires the retrieval query from the retrieval area 501. The acquisition unit 111 transmits the acquired retrieval query to the retrieval unit 112.

The retrieval unit 112 transmits the acquired retrieval query to the database server 20 and acquires the retrieval results according to the retrieval query from the food DB212 of the database server 20. When the retrieval query contains a plurality of retrieval results, the retrieval results are acquired as a results list.

The output unit 113 outputs the retrieval result acquired from the food DB212 to the result area 502. The output unit 113 displays the results list in the result area 502 when outputting the retrieval results of the first retrieval query. When the delimiter is input to the retrieval area 501 after the first retrieval query, one of the retrieval results is selected from the results list and displayed. The results list including the retrieval results is displayed in response to selecting the retrieval results displayed in the result area 502.

The recording unit 114 stores the food selected by the recording icon in the meal management DB213. The recording unit 114 can select the plurality of retrieval results displayed in the result area and record the retrieval results one by one. In addition, the plurality of retrieval results can be recorded together.

In the portable terminal 30, the program for executing the retrieval method includes a providing unit 311, an input unit 312, an acquisition unit 313, and an output unit 314.

The providing unit 311 provides a display screen including the retrieval area 501 and the result area 502 to the display unit 305 of the portable terminal 30.

The input unit 312 is a software keyboard and the like for inputting the retrieval query into the retrieval area 501.

The acquisition unit 313 acquires the retrieval query input to the retrieval area 501 and transmits it to the retrieval server 10.

The output unit 314 receives the retrieval results corresponding to the retrieval query from the retrieval server 10 and displays the retrieval results in the result area 502.

<Flowchart of the Retrieval Method>

Next, the retrieval method according to an exemplary embodiment-will be described referring to FIG. 11 to FIG. 14. The retrieval server 10 causes the control unit 101 to execute each process.

Figure 11:
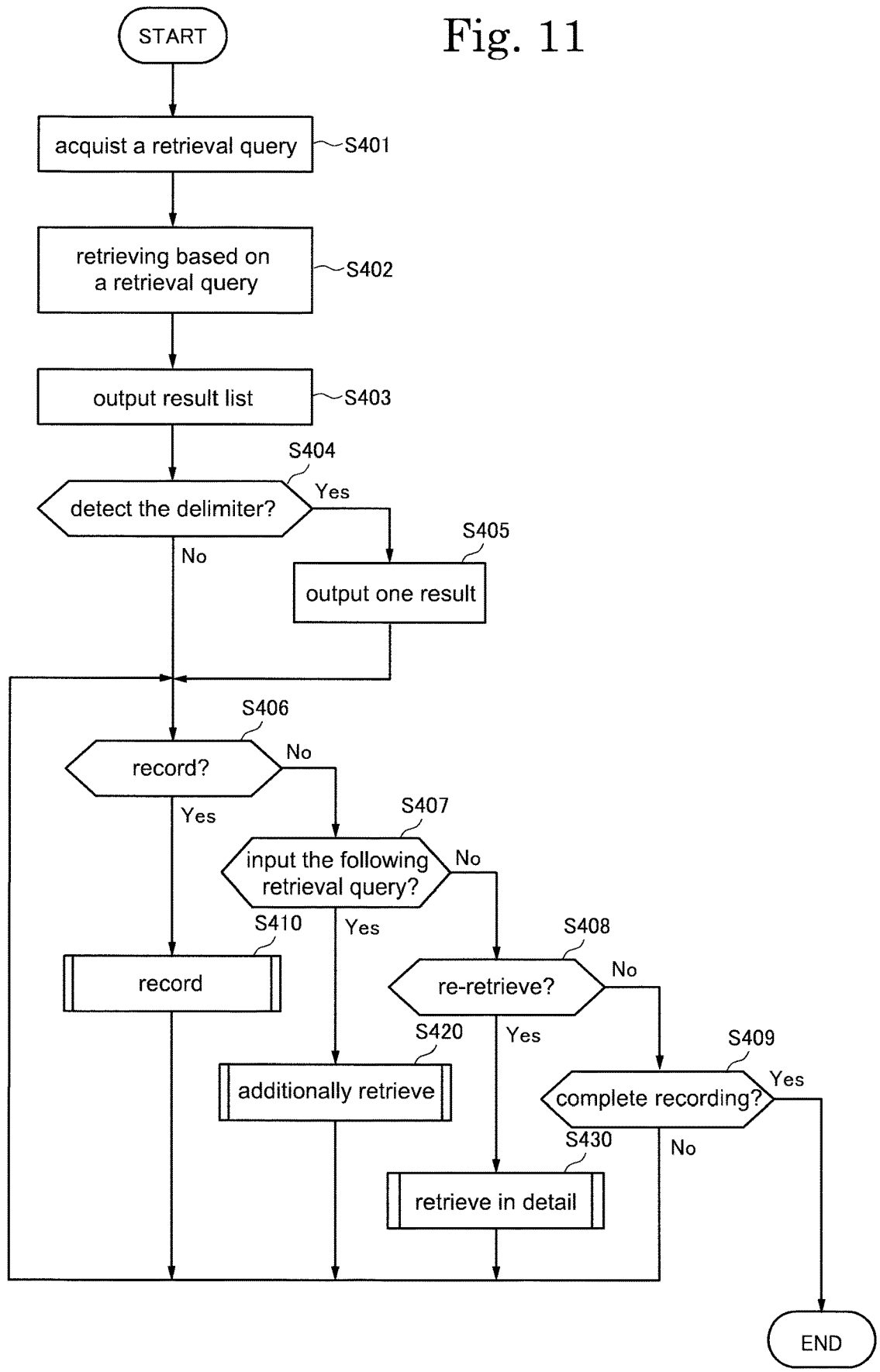
FIG. 11 is a flowchart illustrating a retrieval method according to an exemplary embodiment.

FIG. 11 is a flowchart illustrating the flow of a series of processes of the retrieval method. First, the acquisition unit 111 in the retrieval server 10 acquires the retrieval query from the retrieval area 501 (step S401). The retrieval unit 112 references the food DB212 based on the retrieval query and retrieves the retrieval query (step S402). Next, the output unit 113 outputs a results list including a plurality of foods according to the retrieval query (step S403). Here, the process of step S403 corresponds to the display screen of FIG. 3.

Next, the acquisition unit 111 determines whether or not the delimiter has been detected from the portable terminal 30 (step S404). When the delimiter has been detected (step S404; Yes), the process proceeds to step S405, and when the delimiter has not been detected (step S404; No), the process proceeds to step S406. Here, assuming that the acquisition unit 111 has not detected the delimiter, and the process proceeds to step S406.

Next, the output unit determines whether or not the results list is displayed (step S406). When the results list is displayed (step S406; YES), the process proceeds to step S410, and when the results list is not displayed (step S406; NO), the process proceeds to step S407. Here, assuming that the results list is not displayed, the process proceeds to step S407.

Next, the acquisition unit 111 determines whether or not the following retrieval query is input to the retrieval area 501 (step S407). When the following retrieval query is input (step S407; Yes), the process proceeds to step S420, and when the following retrieval result is not input (step S407; No), the process proceeds to step S408. Here, assuming that the following retrieval query is not input in the retrieval area 501, the process proceeds to step S408.

Next, the retrieval unit 112 determines whether or not the retrieval result of the result area 502 has been selected and a re-retrieval has been detected in step S408. When the retrieval result is selected and the re-retrieval is detected, the process proceeds to step S430, and when the re-retrieval is not detected, the process proceeds to step S409. Here, assuming that the re-retrieval is not detected, and the process proceeds to step S409.

Lastly, the recording unit 114 determines whether or not the completion of recording has been detected in step S409. When the completion of recording is detected (step S409; Yes), the retrieval process is terminated (END), and when the completion of recording is not detected (step S409; Yes), the process proceeds to step S406.

In step S404, when the delimiter is detected, the output unit 113 selects one retrieval result from the retrieval list and outputs it to the result area 502 and the process proceeds to step S406.

The above is a series of flows of the retrieval method. Next, the processes of step S410, step S420, and step S430 will be described in detail.

<Flowchart of Step S410>

Figure 12:
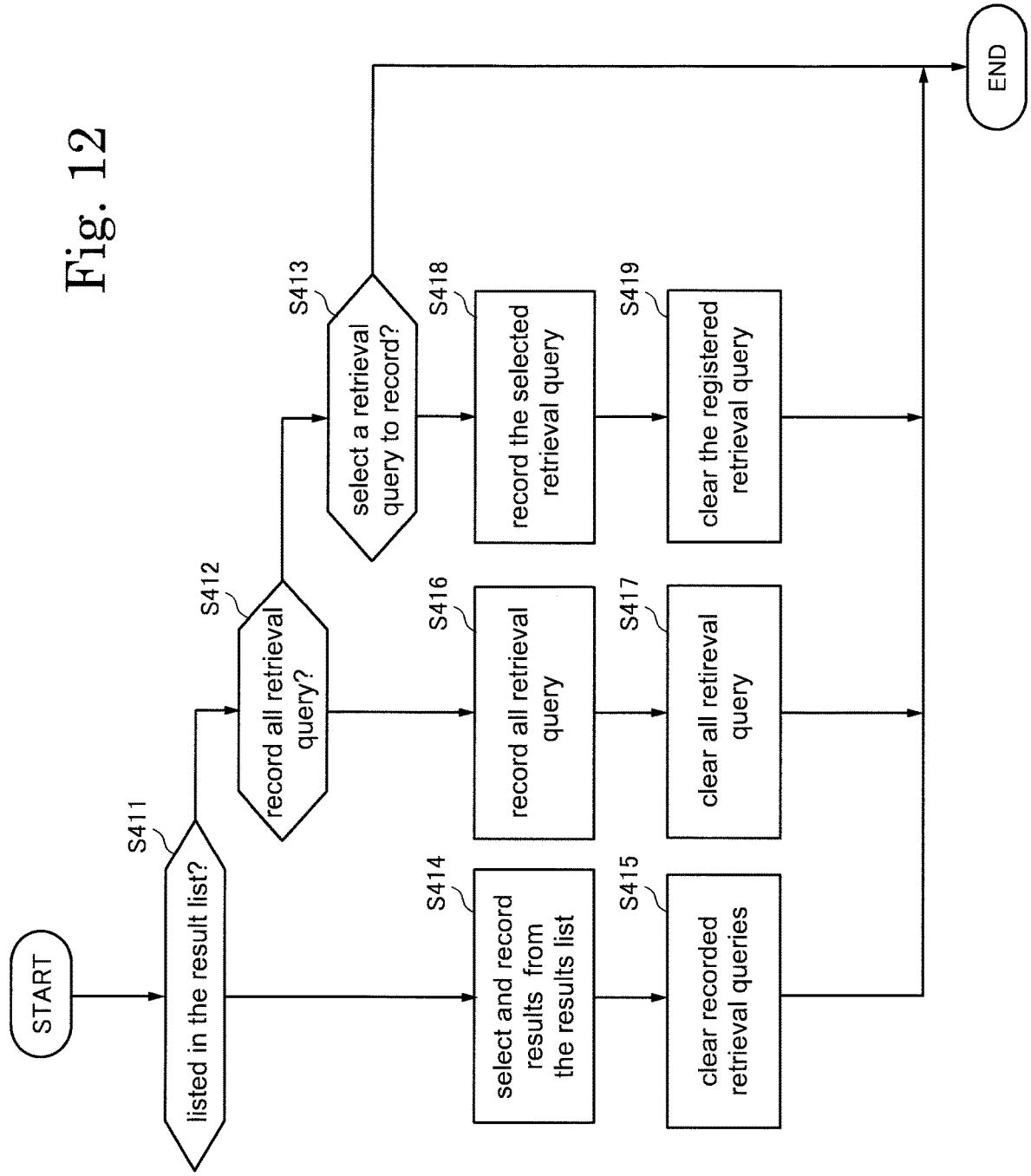
FIG. 12 is a flowchart illustrating a retrieval method according to an exemplary embodiment.

FIG. 12 is a flowchart illustrating a method of recording the retrieval result in the meal management DB213. The output unit determines whether or not the results list of the first retrieval query is displayed on the result area 502 (step S411). When the results list is displayed (step S411; YES), the process proceeds to step S414, and when the results list is not displayed (step S411; NO), the process proceeds to step S412. Here, assuming that the results list is not displayed, the process proceeds to step S412.

Next, the recording unit 114 determines whether or not to record the retrieval results for all the retrieval query in the meal management DB213 (step S412). When the retrieval results for all the retrieval query is recorded (step S412; Yes), the process proceeds to step S416, and when the retrieval results for all the retrieval query is not recorded (step S412; No), the process proceeds to step S413. Here, assuming that the retrieval results for all the retrieval query is not recorded, the process proceeds to step S413.

Next, the recording unit 114 determines whether or not to select the retrieval result for the retrieval query and record it (step S413). When selecting and recording the retrieval result for the retrieval query (step S413; Yes), the process proceeds to step S418 and if the retrieval result for the retrieval query is not selected and recorded (step S413; No), the recording processing is terminated (END). Here, assuming that the retrieval result for the retrieval query is not selected and recorded, the recording processing is terminated (END).

In step S411, when the results list is displayed (step S411; Yes), the recording unit 114 records the retrieval results in the meal management DB213 in response to a candidate retrieval result selecting from the results list (step S415). For example, in FIG. 3, the retrieval result 521_1 is recorded in response to the recording icon 522_1 selecting. The acquisition unit 111 deletes the recorded retrieval query and terminates the recording processing (END). The first retrieval query 511 shown in FIG. 3 is deleted.

In step S412, when recording the retrieval results for all the retrieval query at once (step S412; Yes), the recording unit 114 records the retrieval results for all the retrieval query (step S416). For example, in FIG. 3, the retrieval results 521_1 and 524_1 are recorded in response to the recording icon 526 selecting. The acquisition unit 111 deletes all the recorded retrieval query and terminates the recording processing (END). In FIG. 3, the first retrieval query 511A and a second retrieval query 512A are deleted.

In step S413, when selecting and recording the retrieval result for the retrieval query (step S413; Yes), the recording unit 114 records the retrieval result for the selected retrieval query (step S419). For example, in FIG. 9, the retrieval result 521_1 is recorded in response to the recording icon 522_1 selecting. The acquisition unit 111 deletes the recorded retrieval query and terminates the recording processing (END). The first retrieval query 511A shown in FIG. 4 is eliminated. The process proceeds to step S406 in response to the recording processing terminating.

<Flowchart of Step S420>

Figure 13:
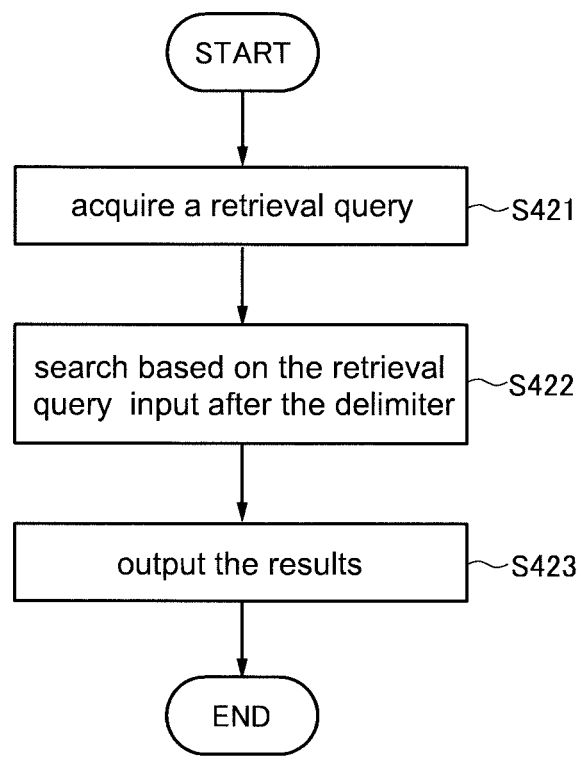
FIG. 13 is a flowchart illustrating a retrieval method according to an exemplary embodiment.

FIG. 13 is a flowchart illustrating an additional retrieval method. The acquisition unit 111 acquires the retrieval query added from the retrieval area 501 (step S421). For example, in FIG. 5, the second retrieval query 512 is acquired from the retrieval area 501. Then, based on the added retrieval query, retrieval is performed by referring to the food DB212 (step S422). Next, the output unit 113 outputs the retrieval result including the food according to the retrieval query to the result area 502 (step S423) and terminates the additional retrieval process (END). For example, in FIG. 5, the retrieval result 524_1 is output to the result area 502. When the additional retrieval method is terminated, the process proceeds to step S406.

<Flowchart of Step S430>

Figure 14:
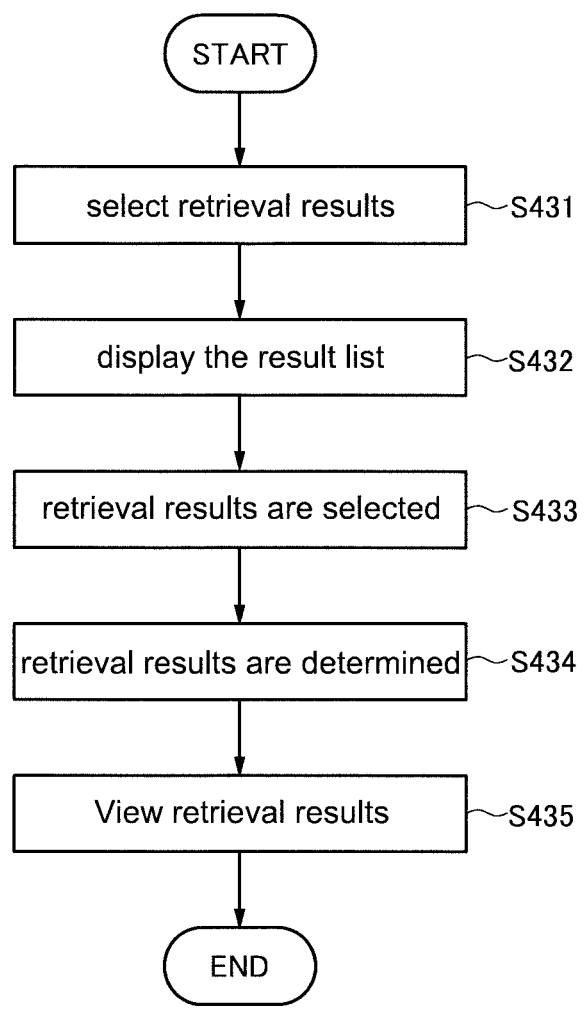
FIG. 14 is a flowchart illustrating a retrieval method according to an exemplary embodiment.

FIG. 14 is a flowchart illustrating a re-retrieval method of the retrieval query. The output unit 113 detects that the re-retrieval icon for any retrieval result has been selected (step S431). For example, in FIG. 5, it is detected that the re-retrieval icon 523 is selected. The output unit 113 outputs the results list including the retrieval result (step S432). In FIG. 6, the results list including the retrieval result 521_1 is output. When the retrieval result is selected from the results list (step S434), the output unit 113 determines the retrieval result, displays it in the result area 502, and terminates the re-retrieval process (END). When the retrieval result 521_3 is selected, the output unit 113 displays the retrieval result 521_3 instead of the retrieval result 521_1 of the result area 502. When the re-retrieval process is terminated, the process proceeds to step S406.

Conventionally, when recording one meal, "keyboard operation for keyword input" and "food selection operation" are executed in a series of flows for retrieving a single food. The keyboard operation and the selection operation are executed differently. However, users often consume a plurality of foods in a single meal. Therefore, when retrieving for and recording a plurality of foods in the system, the keyboard operation and the selection operation flows must be repeated multiple times. Besides, the screen transition is performed every time the keyboard operation and the selection operation are performed, which may increase the burden on the user.

When the input burden increases when the user records the foods in the system, the user is discouraged from recording the foods in the system. This makes it difficult for the user to manage nutritional balance and calorie intake by the system.

On the other hand, in the retrieval method according to exemplary embodiments, by repeatedly executing the process of steps S406 to S409 shown in FIG. 11, the plurality of retrieval query can be continuously input and retrieved. The retrieval result of the plurality of retrieval queries is displayed on the same display screen as the retrieval area. After terminating the retrieval of all the foods, the user can confirm whether each retrieval result is the target food. Therefore, in the retrieval system 1, "keyboard operation for keyword input" and "food selection operation" can be executed separately. Further, since the retrieval area 501 and the result area 502 are displayed on the same screen, it is possible to reduce screen transitions between retrieving and recording a plurality of foods. This allows users to retrieve and record foods faster. This makes it easier for users to input the plurality of items into the system.

In the present exemplary embodiment, the retrieval method shown in FIG. 11 to FIG. 14 is executed by the retrieval server 10, but the inventive concept is not limited thereto. Part of the process in the retrieval method may be performed in the portable terminal 30.

In an exemplary embodiment, the method of inputting the retrieval query to the retrieval area 501 by a software key displayed on the display screen 500 has been described, but the inventive concept is not limited thereto. A method of inputting the retrieval query in the retrieval area 501 using a method other than a software key will be described referring to FIG. 15.

Figure 15:
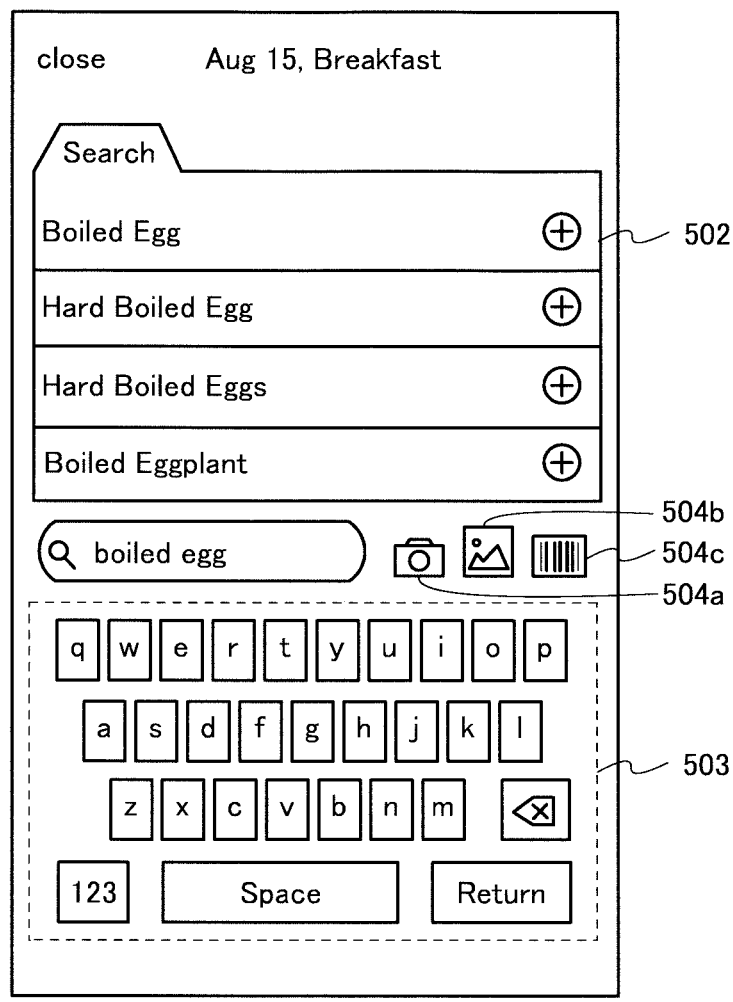
FIG. 15 is an example of a display screen implemented by a program according to an exemplary embodiment.

As shown in FIG. 15, a display screen 500D displays a plurality of icons 504a to 504c in addition to the retrieval area 501, the result area 502, and the keyboard area 503. The imaging unit 307 of the portable terminal 30 can be activated to capture an image in response to the icon 504a selecting. Analyzing the image will populate the retrieval area 501 with the analysis result as the retrieval query. Further, by selecting the icon 504b, the image stored in the storage unit 303 of the portable terminal 30 can be analyzed, and the analysis result may be input to the retrieval area 501 as the retrieval query. The image may be analyzed by the portable terminal 30 or by the retrieval server 10. When the icon 504c is selected, the imaging unit 307 is activated to capture an image of the bar code of the product. Analyzing the bar code will populate the retrieval area 501 with the analysis result as the retrieval query. The bar code may be analyzed by portable terminal 30 or by the retrieval server 10.

In FIG. 2 to FIG. 8, a case in which the first retrieval query 511 and the second retrieval query 512 are input to the retrieval area 501 has been described, but the number of the retrieval query input to the retrieval area 501 is not limited. Also, the retrieval area 501 may be extended according to the number of retrieval query input.

The retrieval system, retrieval method, and the program according to an exemplary embodiment is not limited to a system related to meal management. For example, the inventive concept can be applied to an online shopping system in which a plurality of products is retrieved and purchased at one time.

As described above, according to the retrieval system 1 according to an exemplary embodiment, it is possible to display the retrieval result for the continuously input the retrieval query on the retrieval area each time. Therefore, it is possible to separate the keyboard operation from the selection operation. Also, the screen transition can be reduced between the keyboard operation and the selection operation. This improves user convenience.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A non-transitory computer readable storage medium configured to store instructions executable by a retrieval server to perform a retrieval method, the method comprising:

the retrieval server acquiring a first retrieval query from a retrieval area of a portable terminal communicating with the retrieval server, transmitting the first retrieval query to a database server communicating with the retrieval server, and outputting a first retrieval result to a result area of the portable terminal, the first retrieval result being obtained by the retrieval server referring to a first database of the database server based on the first retrieval query entered by a user into the retrieval area; and the retrieval server acquiring a second retrieval query from a retrieval area of the portable terminal, transmitting the second retrieval query to the database server, and outputting a second retrieval result and the first retrieval result in the result area of the portable terminal, the second retrieval result being obtained by the retrieval server referring to the first database of the database server based on the second retrieval query in response to a delimiter character and the second retrieval query entered by the user next to the first retrieval query into the retrieval area.

2. The retrieval method according to claim 1, further comprising:

changing a border or color of the first retrieval query displayed in the retrieval area in response to acquiring the delimiter character entered after the first retrieval query from the retrieval area.

3. The retrieval method according to claim 1, further comprising:

outputting a second result list comprising the second retrieval result according to the second retrieval query, in response to selecting the second retrieval result; and updating the second retrieval result in response to selecting the second retrieval result from the second result list.

4. The retrieval method according to claim 1, further comprising:

deleting the second retrieval result and the second retrieval query in response to recording the second retrieval result in a second database, leaving the first search result and the first search query displayed.

5. The retrieval method according to claim 2, further comprising:

deleting the first retrieval result and the first retrieval query in response to recording the first retrieval result in a second database, leaving the second search result and the second search query displayed.

6. The retrieval method according to claim 2, further comprising:

deleting the first retrieval result, the second retrieval result, the first retrieval query, and the second retrieval query in response to recording the first retrieval result and the second retrieval result in a second database.

7. The retrieval method according to claim 1, further comprising:

outputting a first result list in response to selecting the first retrieval result; and updating the first retrieval result in response to selecting the first retrieval result from the first result list.

8. The retrieval method according to claim 1, further comprising:

outputting a first result list according to the first retrieval query in response to selecting the first retrieval result;

outputting a third result list comprising a third retrieval result according to a third retrieval query, in response to modifying the first retrieval query entered into the retrieval area to the third retrieval query; and updating the first retrieval result in response to selecting the third retrieval result from the third result list.

9. A non-transitory computer readable storage medium configured to store instructions executable by a retrieval server to perform a retrieval method, the method comprising:

providing a display screen comprising a retrieval area and a result area;

the retrieval server acquiring a first retrieval query from the retrieval area of the display screen communicating with the retrieval server, transmitting the first retrieval query to a database server communicating with the retrieval server, and outputting a first retrieval result to the result area of the display screen, the first retrieval result being obtained by the retrieval server referring to a first database of the database server based on the first retrieval query entered by a user into the retrieval area; and the retrieval server acquiring a second retrieval query from the retrieval area of the display screen, transmitting the second retrieval query to the database server, and outputting a second retrieval result and the first retrieval result in the result area of the display screen, the second retrieval result being obtained by the retrieval server referring to the first database of the database server based on the second retrieval query in response to a delimiter character and the second retrieval query entered by the user next to the first retrieval query into the retrieval area.

10. The retrieval method according to claim 9, further comprising:
changing a border or color of the first retrieval query displayed in the retrieval area in response to acquiring the delimiter character entered after the first retrieval query from the retrieval area.

11. The retrieval method according to claim 10, further comprising:
outputting a second result list comprising the second retrieval result according to the second retrieval query in response to selecting the second retrieval result, and
updating the second retrieval result in response to selecting the second retrieval result from the second result list.

12. The retrieval method according to claim 9, further comprising:
deleting the second retrieval result and the second retrieval query in response to recording the second retrieval result in a second database, leaving the first search result and the first search query displayed.

13. The retrieval method according to claim 10, further comprising:
deleting the first retrieval result and the first retrieval query in response to recording the first retrieval result in a second database, leaving the second search result and the second search query displayed.

14. The retrieval method according to claim 10, further comprising:
deleting the first retrieval result, the second retrieval result, the first retrieval query, and the second retrieval query in response to recording the first retrieval result and the second retrieval result in a second database.

15. The retrieval method according to claim 9 further comprising:
outputting a first result list in response to selecting the first retrieval result; and
updating the first retrieval result in response to selecting the first retrieval result from the first result list.

16. The retrieval method according to claim 9 further comprising:
outputting a first result list according to the first retrieval query in response to selecting the first retrieval result;
outputting a third result list comprising a third retrieval result according to a third retrieval query, in response to modifying the first retrieval query entered into the retrieval area to the third retrieval query; and
updating the first retrieval result in response to selecting the third retrieval result from the third result list.

17. A non-transitory computer readable storage medium storing instructions executable by a retrieval server to perform operations, comprising:
providing a display screen comprising a retrieval area and a result area;
the retrieval server acquiring a first retrieval query from the retrieval area of the display screen communicating with the retrieval server, transmitting the first retrieval query to a database server communicating with the retrieval server, and outputting a first retrieval result to the result area of the display screen, the first retrieval result being obtained by the retrieval server referring to a first database of the database server based on the first retrieval query entered by a user into the retrieval area; and
the retrieval server acquiring a second retrieval query from the retrieval area of the display screen, transmitting the second retrieval query to the database server, and outputting a second retrieval result and the first retrieval result in the result area of the display screen, the first retrieval result being obtained by the retrieval server referring to the first database of the database server based on the second retrieval query in response to a delimiter character and the second retrieval query entered by the user next to the first retrieval query into the retrieval area.

* * * * *